J. KIRKWOOD.
DRAIN TRAP.
APPLICATION FILED DEC. 2, 1915.
1,204,786.
Patented Nov. 14, 1916.
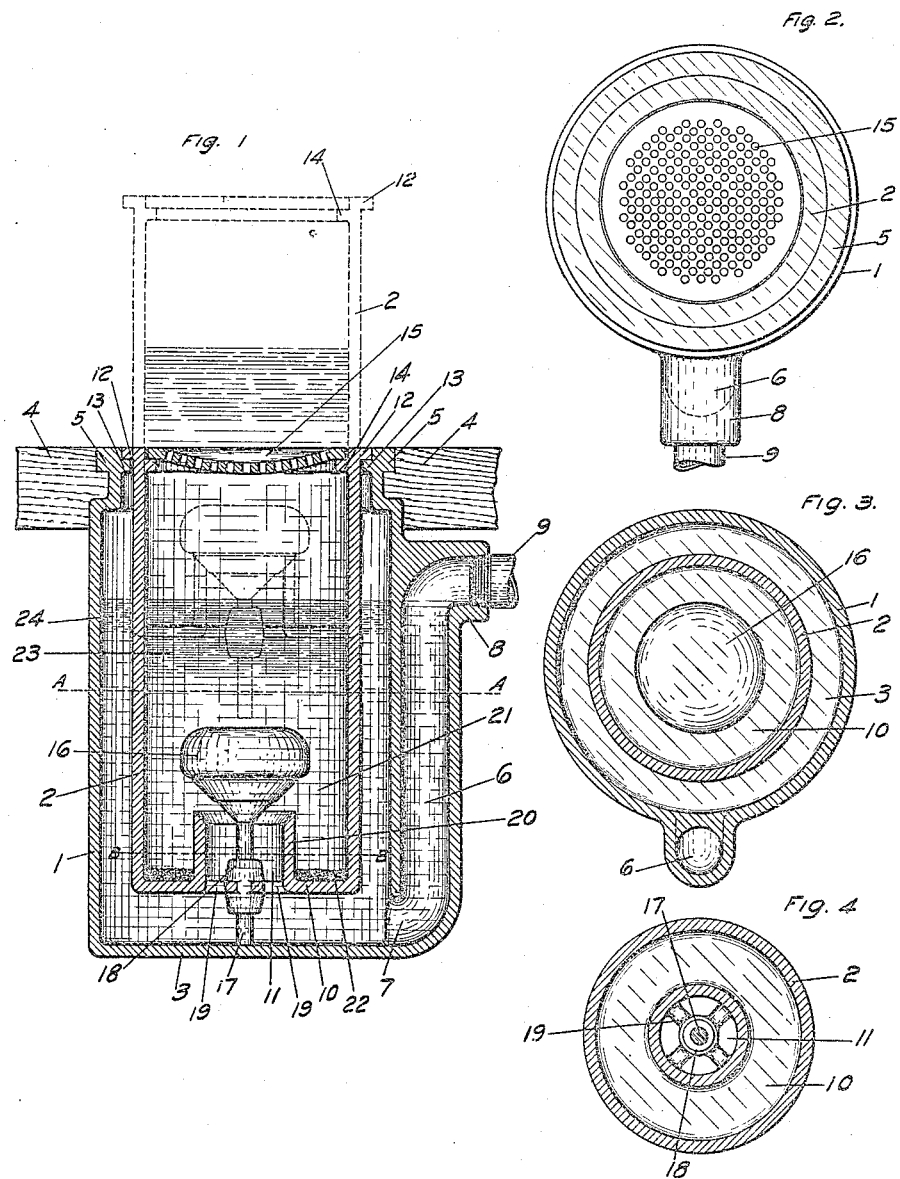
WITNESSES:
N. E. Blake
Lela M. Cole
INVENTOR,
JOHN KIRKWOOD,
BY
ATTORNEY

UNITED STATES PATENT OFFICE.

JOHN KIRKWOOD, OF LENOX, MASSACHUSETTS.

DRAIN-TRAP.

1,204,786.

Specification of Letters Patent.

Patented Nov. 14, 1916.

Application filed December 2, 1915. Serial No. 64,762.

*To all whom it may concern:*

Be it known that I, JOHN KIRKWOOD, a citizen of the United States, residing at Lenox, in the county of Berkshire and State of Massachusetts, have invented certain new and useful Improvements in Drain-Traps, of which the following is a specification.

This invention concerns a trap for drains and waste pipes.

It is particularly, but not exclusively, adapted for use in garages and engine rooms where gasolene, grease and lubricating oils are extensively used and where considerable quantities of these substances are carried off with waste water into sewer connections, thereby clogging the discharge pipes and not infrequently causing subterranean explosions.

The principal object of the invention is to provide improved means for collecting waste substances having a specific gravity either less or greater than water and for removing them from time to time.

With the foregoing and other objects in view, the invention consists in the construction, arrangement, and combination of parts as hereinafter described and claimed, a specific useful form of embodiment thereof being illustrated in the accompanying drawings, wherein—

Figure 1 is a vertical sectional view of the device operatively secured in the floor of a building and forming the inlet to a drain pipe, the relative position of the inner chamber or trap during the process of its removal from the outer chamber being indicated in dotted lines; Fig. 2, a top plan view of the device showing the drain connection cutaway; Fig. 3, a cross-section on the line A—A of Fig. 1, showing a top view of the lower portion of my device; and Fig. 4, a cross-section of the trap on the line B—B of Fig. 1, showing the top view of the valve mounting.

As shown, the device comprises a fixed outer chamber 1 and a separate inner chamber 2 seated in the outer chamber and adapted to be readily removed therefrom and emptied of its contents, such as oil, dirt and other foreign substances, and restored to its normal position within the outer chamber, from time to time, as hereinafter more particularly stated.

The outer chamber or well 1 is of cylindrical formation and supported in a vertical position, the lower end of the well being closed by a bottom 3. As shown, said well is suitably seated in a fixed position in the floor 4 of a building so that its upper end does not project above the surrounding drainage surface, being preferably suspended by an annular exterior flange 5 provided on its reduced upper end and projecting into the material of the floor.

A vertically arranged inclosed outlet or passage 6, forming a separate chamber, is provided preferably exteriorly of the well 1, by an enlargement of the outer wall thereof, as shown, or in any other preferred form to maintain the fluid contents of the well at a predetermined level below its top and to carry off the excess, said outlet being connected at its lower end to the interior of the well 1 by an opening 7 provided through the side wall of the well near the bottom 3, and having an outlet 8 at its upper end adapted for connection with a drain pipe 9.

As shown, a separate removable inner chamber or trap 2 of smaller diameter than the well 1 is mounted therein, said trap being of cylindrical formation, open at the top and provided at its lower end with a bottom 10 having a central opening 11 for connecting the two chambers. The trap 2 is suspended at its upper end by an annular laterally-projecting flange 12 exteriorly provided on the trap and arranged to bear upon a separate annular flange or seat 13 interiorly provided on the well 1. A further annular flange or seat 14 is interiorly provided on the wall of the trap 2 somewhat below the upper edge thereof to carry a circular perforate cover 15 removably mounted thereon, said cover being preferably of a concave formation.

As shown, a valve 16 is provided at the bottom of the trap 2, said valve having a stem 17 which extends downward through the opening 11 in the trap bottom 10 for contact with the bottom 3 of the well when said chambers are operatively arranged together, and is slidably fitted in a vertical bearing 18 disposed centrally in the opening 11 and connected to the bottom 10 by radial arms 19, 19, etc. The valve 16 is of the gravity type, being of circular formation and tapering downward to seat on an upright beveled flange 20 provided on the bottom 10 around the central opening 11 when the well 1 and trap 2 are disengaged, but when these chambers are normally arranged together the length of the valve stem 17 is adapted by contact with the well bottom 3 to support the valve 16 off its seat, thus providing a free passage for the water in the trap 2 through the opening 11 into the well 1.

When the waste water designated as 21, is drained into the trap 2 it fills first the space around the seat 20 and then overflows into the well 1 through the opening 11 and thence flows into the outlet 6 through the opening 7, finally establishing a common level in each of said chambers with the outlet 8. Any sediment or solid matter, designated as 22, in the water will gravitate to the bottom of the trap and collect around the seat 20 while oils and other substances, designated as 23, of less specific gravity than water will float and collect on the surface of the water whose level is constantly maintained above the valve 16. When the foreign substances referred to have accumulated in quantity, the trap 2 is removed from the well 1 and cleaned, the flange 14 serving as a convenient means for lifting the trap after removal of the cover 15. The upward displacement of the trap 2 causes the instant downward displacement of the valve 16 through the action of gravity, thereby sealing the opening 11 and preventing the further escape of any of the contents of the trap.

While the trap 2 is designed to collect substantially all oils and other foreign substances lighter than water which are drained therein, any portion of such foreign substances, designated as 24, escaping through the trap 2 will tend in like manner to collect at the surface of the water in the well 1, and thus may readily be removed therefrom upon removal of the trap 2.

I claim:

1. In a device of the class described, a chamber having an inlet and an outlet; a separate removable chamber arranged within the outer chamber and having an inlet, and an outlet opening into the outer chamber; and a valve and a valve-seat for controlling the outlet of the inner chamber, said valve having a stem extending through the bottom of the inner chamber of a proper length for engagement with the outer chamber when said chambers are fitted together, to raise the valve off the valve-seat.

2. In a device of the class described, the combination with a fixed chamber having a bottom and side walls and an open receiving end and a lateral outlet below the receiving end, of a separate removable chamber having a bottom and side walls and an open receiving end, and an outlet through its bottom, said removable chamber being of smaller dimensions than the fixed chamber and adapted to be projected into and withdrawn from the fixed chamber, means for supporting the removable chamber within the fixed chamber above the bottom of the fixed chamber, and means for opening and closing the outlet in the removable chamber and including a valve having a depending stem projecting through said outlet in the bottom of the removable chamber, and an annular upright valve-seat disposed around the outlet in said bottom and adapted to seat the valve, said valve stem being of a proper length to engage the bottom of the fixed chamber when said chambers are fitted together, to raise the valve off its seat.

In testimony whereof I hereto affix my signature in presence of two witnesses.

JOHN KIRKWOOD.

Witnesses:
 JNO. J. WHITTLESEY,
 LELA M. COLE.

Copies of this patent may be obtained for five cents each, by addressing the "Commissioner of Patents, Washington, D. C."